Sept. 29, 1959 S. J. BROLIN 2,906,941

CURRENT SUPPLY APPARATUS

Filed June 10, 1958

INVENTOR
S. J. BROLIN
BY
G. F. Heuerman
ATTORNEY

United States Patent Office 2,906,941

Patented Sept. 29, 1959

2,906,941

CURRENT SUPPLY APPARATUS

Stephen J. Brolin, Bronx, N.Y., assignor to Bell Telephone Laboratories, Incorporated, New York, N.Y., a corporation of New York Application June 10, 1958, Serial No. 741,044

10 Claims. (Cl. 323—22)

Figure 1:
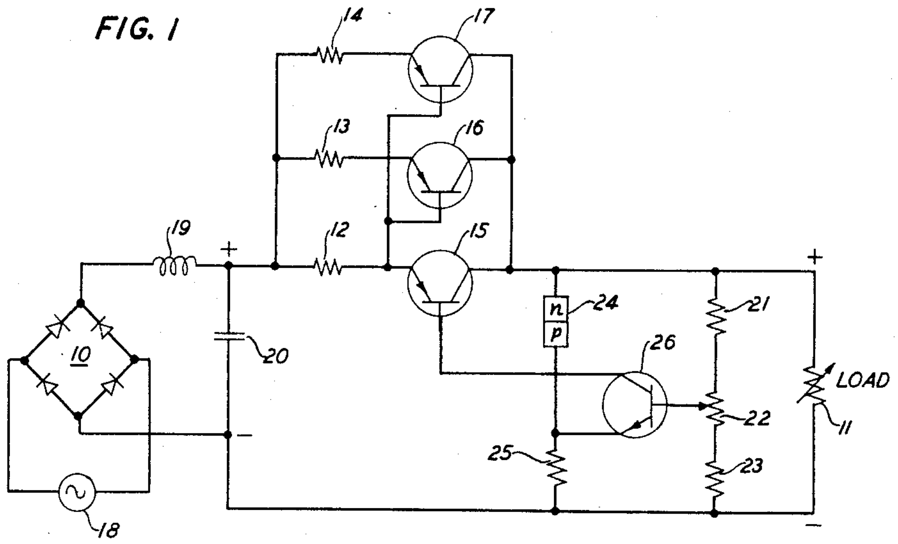

This invention relates to current supply apparatus and particularly to a current supply circuit employing semi-conductor variable impedance devices in parallel connected current paths.

An object of the invention is to provide an improved regulating current supply circuit having a plurality of parallel connected variable impedance current paths for sharing a portion at least of the current flowing in the circuit.

The invention is particularly applicable to voltage or current regulating circuits employing semi-conductor variable impedance devices such as transistors or constant voltage, p-n junction diodes, for example. In such circuits, whenever the maximum current required to flow through a transistor or a constant voltage diode exceeds its current or power rating, there may be provided a plurality of current paths in parallel each for transmitting a portion of the total current. It is desirable that the total current be shared equally, or nearly so, by the several connected parallel paths and that the circuit arrangement provided for causing the load sharing be as simple and inexpensive as possible.

In United States Patent No. 2,751,549 to F. H. Chase, June 19, 1956, there is disclosed a current supply circuit comprising a series regulating transistor through the emitter-collector path of which the load current is transmitted. The emitter-collector impedance of the series transistor is controlled in response to load voltage changes for causing changes of load voltage to be minimized. In accordance with a specific embodiment of the invention, herein shown and described for the purpose of illustration, there is provided a regulating circuit which is a modification of the type of regulating circuit disclosed in said Chase patent. There are provided, instead of a single series transistor, a plurality of similar current paths connected in parallel, each path comprising the emitter-collector path of a transistor and a resistor in series with the emitter of the transistor. A first of the transistors is controlled in response to load voltage changes, as disclosed in said Chase patent. The resistor in series with the emitter of said first transistor has a somewhat larger resistance than the resistance of each of the other emitter resistors. The emitter of said first transistor and the bases of the other series transistors are maintained at substantially the same potential by conductively connecting them. There is thus provided, in a voltabge regulator, a simple and inexpensive current sharing circuit which operates to cause the load current to be shared substantially equally by a plurality of parallel connected current paths each of which comprises the emitter-collector path of a transistor.

In accordance with a modified embodiment of the invention, herein shown and described, there are provided a plurality of variable impedance shunt current paths connected in parallel across a load to which direct current is supplied through a series resistor. A first of the shunt current paths comprises a first resistor, the resistance of which is small compared to the resistance of the series resistor, and one or more p-n junction, constant voltage diodes, all in series. Each diode is preferably poled so that the current flows through it in the inverse or high resistance direction. An increase of current flowing through the diode or diodes in response to an increase of load voltage, for example, causes the resistance of each diode to decrease so as to maintain the voltage across the diode or diodes substantially constant over an operating current range. The remaining similar shunt current paths each comprises a second resistor, the emitter-collector path of a transistor and one or more p-n junction, constant voltage diodes, all in series. The resistors of the shunt current paths, respectively, each have a first terminal connected to a terminal of the load. The second terminal of the first resistor is connected to the base of the transistor in each of the remaining shunt paths. The second terminal of the resistor in each of the remaining shunt paths is connected to the emitter of the transistor in the shunt path. Preferably the resistance of the resistor in the first shunt path is somewhat larger than the resistance of the resistor in each of the remaining shunt paths. Moreover, the voltage across the constant voltage diode or diodes in the first shunt path is preferably somewhat larger than the voltage across the constant voltage diode or diodes in each of the remaining shunt paths. For example, similar diodes may be used in the shunt paths, the number of series connected diodes in the first path being larger by one at least than the number of diodes in each of the remaining shunt paths.

Figure 2:
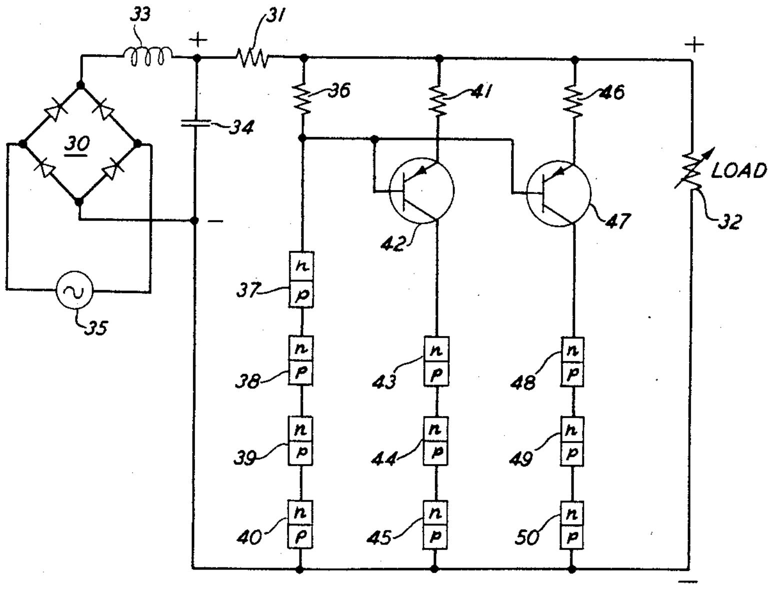

The invention will now be described in greater detail with reference to the accompanying drawing in which:

Fig. 1 is a schematic view of a current supply circuit embodying the invention; and Fig. 2 is a schematic view of a current supply circuit which is a modification of the circuit shown in Fig. 1.

Referring now to Fig. 1 of the drawing, there is provided for supplying current from a rectifier 10 to a load 11 a circuit having three parallel branch paths comprising resistors 12, 13 and 14 and similar p-n-p type transistors 15, 16 and 17. The input terminals of rectifier 10 are connected to an alternating current supply source 18. The rectifier output terminals are connected to a ripple filter comprising a series inductor 19 and a shunt capacitor 20. The negative output terminal of the rectifier is connected to the negative load terminal. The positive output terminal of the rectifier-filter is connected to a common terminal of resistors 12, 13 and 14. The resistors 12, 13 and 14 are connected to the emitters of transistors 15, 16 and 17, respectively. The collectors of transistors 15, 16 and 17 are connected to the positive load terminal. The emitter of transistor 15 is connected to the base of each of transistors 16 and 17.

The resistance of resistor 12 is somewhat larger than the resistance of each of resistors 13 and 14. For example, resistor 12 may have about 8.25 ohms resistance and each of resistors 13 and 14 may have a resistance of 6.81 ohms. With resistance values of this order, the emitter of each of transistors 16 and 17 will be slightly positive with respect to its base when the currents flowing through the three parallel current paths, respectively, are substantially equal.

There are connected across the load 11 a current path comprising a resistor 21, a potentiometer 22 and a resistor 23, all in series, and a current path comprising a p-n junction, constant voltage diode 24 and a resistor 25 in series. There is provided a n-p-n type transistor 26 having a base connected to the variable tap of potentiometer 22, an emitter connected to the common terminal of constant voltage diode 24 and resistor 25 and a collector connected to the base of transistor 15.

If the voltage across the load should decrease slightly, for example, the base of transistor 26 would become relatively more positive with respect to its emitter to cause increased current to flow into its base and out of its emitter. As a result, increased current flows into the emitter and out of the base of transistor 15 and into the collector of transistor 26. Therefore, the current flowing through resistor 12 into the emitter and out of the collector of transistor 15 and through the load 11 is increased. The increased voltage drop across resistor 12 causes increased current to flow through resistor 13 into the emitter and out of the base of transistor 16 and causes increased current to flow through resistor 14 into the emitter and out of the base of transistor 17. The current supplied through the resistor 13 and the emitter-collector path of transistor 16 to the load and the current supplied through resistor 14 and the emitter-collector path of transistor 17 to the load are thus increased. The initially assumed decrease of load voltage is thus minimized.

When the resistance of resistor 12 is fixed, the current through the path 13, 16, for example, may be increased with respect to the current through the path 12, 15 by decreasing the resistance of resistor 13, thereby making the emitter of transistor 16 relatively more positive with respect to its base. To maintain a substantially constant load voltage, the current through the path 12, 15, therefore, will decrease. It will thus be seen that the currents flowing through the three parallel branch paths may be equalized by adjusting or selecting the resistance values of resistors 13 and 14. While the load circuit shown in Fig. 1 comprises three parallel branch paths each including a transistor and a resistor, a larger or a smaller number of parallel branch paths each for conducting a portion of the load current may be provided.

In the embodiment of the invention shown in Fig. 2, current is supplied from a rectifier 30 through the ripple filter and a series resistor 31 to a load 32. The ripple filter connected to the output terminals of rectifier 30 comprises a series inductor 33 and a shunt capacitor 34. The input terminals of rectifier 30 are connected to an alternating current supply source 35.

Three shunt current paths in parallel are connected across the load. A first of the shunt paths comprises a resistor 36 and four similar p-n junction, constant voltage diodes 37, 38, 39 and 40, all in series. A second of the three shunt paths comprises a resistor 41, the emitter-collector path of a p-n-p type transistor 42 and three diodes 43, 44 and 45 like the diodes in the first path, all in series. The third shunt path comprises a resistor 46, a transistor 47 like the transistor 42, and three diodes 48, 49 and 50 like the diodes in the first and second shunt current paths, all in series. Resistors 36, 41 and 46 have a common terminal connected to the positive load terminal and diodes 40, 45 and 50 have a common terminal connected to the negative load terminal. The emitters of transistors 42 and 47 are connected through resistors 41 and 46, respectively, to the positive load terminal. The common terminal of resistor 36 and diode 37 is connected to the base of transistor 42 and to the base of transistor 47 so that the bases of transistors 42 and 47 are at substantially the same potential as the common terminal of resistor 36 and diode 37. The resistance of resistor 36 is somewhat larger than the resistance of resistor 41 and of resistor 46, the resistors 41 and 46 having substantially equal resistance. The emitter of each of transistors 42 and 47 is thus somewhat positive with respect to its base when substantially equal currents flow in the three shunt paths. Moreover, the substantially constant voltage across diodes 37, 38, 39 and 40 in series is larger than the voltage across diodes 43, 44 and 45 in series and larger than the voltage across the diodes 48, 49 and 50 in series. Therefore, the potential of the base of each of transistors 42 and 47 is positive with respect to the potential of its collector.

The voltage across the load 32 may increase slightly, for example, due to an increase of output voltage of the rectifier-filter 30, 33 and 34 or due to an increase of resistance of the load 32, that is, a decrease of load, or both. The resulting increased current flowing through the shunt current paths across the load will cause the voltage drop across the series resistor 31 to increase, thereby minimizing the assumed increase of load voltage.

The resistance of each of resistors 36, 41 and 46 is small compared with the total resistance of the shunt paths, respectively, and small compared with the resistance of the series resistor 31. Therefore, even when the current flowing through each of the shunt paths is at a maximum value of the operating range, the voltage drop across each of resistors 36, 41 and 46 is only a small portion of the load voltage. The resistance of resistor 36 is larger than the resistance of each of resistors 41 and 46 by such an amount that the currents flowing through the shunt paths, respectively, are substantially equal. When the voltage at the output of the rectifier-filter 30, 33 and 34 is fixed, a decrease of current flowing through the load 32 will cause the currents flowing in the shunt paths to increase sufficiently to maintain substantially constant the current through and the voltage drop across resistor 31, thereby compensating for changes in load current. If, on the other hand, the load is fixed, an increase of output voltage of the rectifier-filter 30, 33 and 34 will cause the currents flowing through the shunt paths to increase. As a result the voltage drop across resistor 31 increases sufficiently to cause the load voltage to be maintained substantially constant.

An increase, for example, of the current flowing through the first shunt current path causes the potential of the emitter of each of transistors 42 and 47 to become relatively more positive with respect to its base. The emitter-collector resistance of each of transistors 42 and 47 thus decreases to cause the currents in the second and third shunt paths to increase. If the current in the second shunt path should increase with respect to the current in the first shunt path, for example, the emitter of transistor 42 will become relatively less positive with respect to its base. The resistance of the emitter-collector path of transistor 42 thus increases, thereby limiting the increase of current in the second shunt path. The circuit thus operates to maintain the currents in the shunt current paths susbtantially equal.

Three parallel branch paths each comprising a resistor and a transistor are shown in Fig. 1 and three shunt paths across the load are shown in Fig. 2, for the purpose of illustration. It will be understood from the above description that the number of paths in each case may be reduced to two or increased to more than three. It will also be understood that n-p-n type transistors may be used in place of the p-n-p type transistors 15, 16 and 17 in Fig. 1, the resistors 12, 13 and 14 being connected in the emitter paths of the transistors, respectively, and the circuit being further modified as taught in said Chase patent, supra. Likewise, in Fig. 2, n-p-n transistors may be used in place of the p-n-p type transistors 42 and 47 with the resistors 41 and 46 being connected in the emitter paths of the transistors, respectively. In this case, of course, the common terminal of resistors 36, 41 and 46 would be connected to the negative load terminal and the common terminal of diodes 40, 45 and 50 would be connected to the positive load terminal. The constant voltage diodes in the shunt current paths would, of course, be reversed.

What is claimed is:

1. In combination, a first and a second resistor each having a first and a second terminal, the resistance of said first resistor being larger than the resistance of said second resistor, a transistor having an emitter, a collector and a base, a first variable impedance means having a first and a second terminal, a second variable impedance means comprising the emitter-collector path of said transistor, said second variable impedance means having a first terminal which is the emitter of said transistor and a second terminal, means for connecting the first terminal of said first variable impedance means to the second terminal of said first resistor and to said base, means for connecting the first terminal of said second variable impedance means to the second terminal of said second resistor, a direct-current circuit having a first and a second branch path connected in parallel, said first branch path comprising said first resistor and said first variable impedance means in series, said second branch path comprising said second resistor and said second variable impedance means in series, a source of direct current and means for supplying direct current from said source to said circuit.

2. In combination, a circuit having a first and a second branch path connected in parallel and having a first common terminal and a second common terminal, a first and a second resistor each having a first terminal connected to said first common terminal and each having a second terminal, a transistor having an emitter, a collector and a base, a first and a second constant voltage means to each of which direct current may be supplied for setting up thereacross a voltage which is substantially constant over an operating range of current amplitude, each of said constant voltage means having a first terminal and a second terminal, said second terminal of each of said constant voltage means being connected to said second common terminal, means for connecting said second terminal of said first resistor to said first terminal of said first constant voltage means and to said base, means for connecting said second terminal of said second resistor to said emitter, means for connecting said first terminal of said second constant voltage means to said collector, and current supply means connected to said first and second common terminals.

3. A combination in accordance with claim 2 in which the resistance of said first resistor is larger than the resistance of said second resistor.

4. A combination in accordance with claim 2 in which the voltage drop across said first resistor is larger than the voltage drop across said second resistor.

5. A combination in accordance with claim 2 in which the voltage across said first constant voltage means is larger than the voltage across said second constant voltage means.

6. A combination in accordance with claim 4 in which the voltage across said first constant voltage means is larger than the voltage across said second constant voltage means.

7. A combination in accordance with claim 2 in which said first and second constant voltage means comprise similar p-n junction diodes, the number of diodes in series of said first constant voltage means being larger than the number of diodes in series of said second constant voltage means.

8. A combination in accordance with claim 3 in which each of said first and second constant voltage means comprises a plurality of p-n junction diodes in series, the number of said diodes in series of said first constant voltage means being one greater at least than the number of diodes in series of said second constant voltage means.

9. Apparatus for supplying current from a direct-current supply source to a load comprising a first resistor in series with said supply source and said load, a second and a third resistor, the resistance of said first resistor being several times at least the resistance of said second resistor, the resistance of said second resistor being larger than the resistance of said third resistor, a plurality of similar p-n junction constant voltage diodes, a transistor having an emitter, a collector and a base, a first and a second current path connected across said load, said second and third resistors having a common terminal connected to one of said load terminals, said first current path comprising said second resistor and a plurality of said constant voltage diodes in series, said second current path comprising said third resistor, the emitter-collector path of said transistor and a plurality of said constant voltage diodes, all in series, the number of said diodes in said first current path being larger than the number of said diodes in said second current path, and a third current path comprising said second and third resistors and the emitter-base path of said transistor, all in series.

10. A combination in accordance with claim 9 in which there is provided a fourth current path connected in parallel with said first and second current paths across said load, said fourth current path comprising a fourth resistor, the emitter-collector path of a second transistor like said first transistor and a plurality of constant voltage diodes like the diodes in said first and second current paths all in series, the resistance of said fourth resistor being substantially equal to the resistance of said third resistor, said second, third and fourth resistors having a common terminal, the number of diodes of said fourth current path being equal to the number of said diodes in said third current path, and a fifth circuit comprising said second and fourth resistors and the emitter-base path of said second transistor all in series.

References Cited in the file of this patent

UNITED STATES PATENTS

| | | |
|---|---|---|
| 2,372,432 | Keizer | Mar. 27, 1945 |
| 2,435,961 | Gibbons et al. | Feb. 17, 1948 |